United States Patent
Suzuki et al.

(10) Patent No.: US 6,457,650 B1
(45) Date of Patent: Oct. 1, 2002

(54) CARD WITH DISPLAY FUNCTION

(75) Inventors: Masaru Suzuki; Shinichi Suzuki; Kanji Kimura, all of Urawa (JP)

(73) Assignee: The Nippon Signal Co., Ltd., Tokyo (JP)

( * ) Notice: Subject to any disclaimer, the term of this patent is extended or adjusted under 35 U.S.C. 154(b) by 0 days.

(21) Appl. No.: 09/582,043

(22) PCT Filed: Oct. 19, 1999

(86) PCT No.: PCT/JP99/05768

§ 371 (c)(1),
(2), (4) Date: Jun. 21, 2000

(87) PCT Pub. No.: WO00/23942

PCT Pub. Date: Apr. 27, 2000

(30) Foreign Application Priority Data

Oct. 21, 1998 (JP) .......................................... 10-300047
Oct. 27, 1998 (JP) .......................................... 10-304967

(51) Int. Cl.[7] ................................................ G06K 19/06
(52) U.S. Cl. ...................................... 235/492; 235/487
(58) Field of Search .................................. 235/492, 487

(56) References Cited

U.S. PATENT DOCUMENTS 4,754,319 A * 6/1988 Saito et al. .................. 235/492

FOREIGN PATENT DOCUMENTS

| JP | 4-105996 | 4/1992 |
| JP | 7-68978 | 3/1995 |
| JP | 7-125483 | 5/1995 |
| JP | 7-175879 | 7/1995 |
| JP | 10-91736 | 4/1998 |
| JP | 10-93484 | 4/1998 |
| JP | 10-105669 | 4/1998 |
| JP | 10-107710 | 4/1998 |
| JP | 10-154215 | 6/1998 |
| JP | 10-154216 | 6/1998 |

OTHER PUBLICATIONS

"Rewritable Recording Material which can be Repeatedly Recorded and Erased", Coloring Materials Association, Inc., vol. 69, No. 5, May 1996, pp. 22–29.

* cited by examiner

Primary Examiner—Harold I. Pitts
(74) Attorney, Agent, or Firm—McDermott, Will & Emery (57) ABSTRACT

An object of the invention is to provide a thin, low cost card with a display function in which the card display information is able to be rewritten within the card itself, without the use of an external rewriting apparatus. For this purpose, a card with a display function of the present invention comprises a data processing section and a display processing section, wherein the display processing section is equipped with a heating section and a thermosensitive section. By using a selection circuit, a plurality of heating elements of the heating section are heated selectively in accordance with stored data in a memory circuit. On sensing the thermal energy, the corresponding portions of the thermosensitive section undergo a variation in state, thereby displaying information corresponding to the stored data. Consequently, the rewriting of display information can be conducted automatically only within the body of the card itself.

14 Claims, 8 Drawing Sheets

1 NON-CONTACT CARD

23 THERMOSENSITIVE SECTION

FIG.4

1 NON-CONTACT CARD

23 THERMOSENSITIVE SECTION

CARD WITH DISPLAY FUNCTION

BACKGROUND OF THE INVENTION

1. Technical Field

The present invention relates to a card with a display function which utilizes a thermosensitive type display device provided in the body of the card to display information relating to the card, and in particular relates to a card with a display function wherein the rewriting of the display information is possible from within the body of the card.

2. Background Art

In conventional cards with a display function, as device for displaying a portion of the data stored on widely used magnetic cards, for example, there has been developed and employed a device with a display section provided on the card surface wherein magnetism is used to set iron powder or the like into a desired shape ("VISMAC" from The Nippon Signal Co., Ltd. is a commercial example of such a product), and a device wherein reversible thermal recording (thermal printing) is carried out on the card surface.

Furthermore, in the case of non-contact cards, which are receiving considerable attention because of the superior performance offered in terms of security and environmental resistance (refer to, for example, Japanese Unexamined Patent Publication No. 10-105669, Japanese Unexamined Patent Publication No. 10-107710, and Japanese Unexamined Patent Publication No. 10-154216), then as considerably cheaper and thinner cards have become available, and the practical applications thereof have increased, there has been a growing demand for an ability to display stored data and the like on such cards, in the same manner as is possible with the aforementioned contact type magnetic cards.

Examples of non-contact cards with a display function which have been proposed include those disclosed in Japanese Unexamined Patent Publication No. 10-93484 and Japanese Unexamined Patent Publication No. 10-154215. The technology disclosed in the above patent publications, in both cases, relies on the use of a display device which utilizes a (ferroelectric) liquid crystal and which is provided on a non-contact card in order to display stored data. Furthermore, in a known non-contact card disclosed in Japanese Unexamined Patent Publication No. 7-125483, technique has been proposed wherein a rewrite layer which enables the rewriting of data and comprises a thermal reversible recording layer, a composite membrane layer, or a magnetic display layer is provided on the card is provided on the card, to display stored data on such a card.

However with the display systems, such as VISMA or thermal printing, applied to conventional cards with a display function as described above, because the card itself does not have a function for rewriting display information, an external rewriting apparatus or the like must be used to rewrite the display information on the card. In such cases however, the possibility arises of the display information that has been rewritten by the external apparatus no longer corresponding to the stored data on the card, and the identification of such a correspondence relationship between the display information and the stored data is difficult. Consequently, cases of misuse have occasionally been reported where, in order to prevent the display information from changing, a piece of tape, for example, is stuck over the display information portion of the card.

Furthermore, in the case of the conventional cards described above which use a liquid crystal display or the like, because of the comparatively high cost of liquid crystals, the cards are expensive. Moreover there is also a limit on how thin the cards can be made. As a result, it is very difficult with current technology to produce a thin, low cost card with a display function as being demanded.

Moreover in a conventional non-contact card with a display function which is provided with a rewrite layer for enabling the rewriting of display information, the device for rewriting the display of the rewrite layer is not provided within the card, and so the rewriting of the rewrite layer must be carried out using an external rewriting apparatus. Because such rewriting apparatus require a mechanical card transport system and a recording device such as a thermal head, not only is one of the advantages of a non-contact system lost, namely the ability to process data without a card transport system, but furthermore the cost of the card system increases. In addition, when a transport system is used in the rewriting of the display, the direction in which a card is inserted into the rewriting apparatus needs to be either identified or restricted in some manner.

The present invention takes the above factors into consideration, with an object of providing a thin, low cost card with a display function in which the card display information is able to be rewritten within the card itself, without the use of an external rewriting apparatus.

SUMMARY OF THE INVENTION

In order to achieve the above object, according to the present invention, there is provided a card with a display function having a thermosensitive section which varies in state on sensing thermal energy, and comprising a display device within the body of the card for displaying information in accordance with the state of the thermosensitive section, wherein the display device incorporates a heating section for generating thermal energy, and the state of the thermosensitive section varies on sensing the thermal energy from the heating section.

With such a construction, the state of the thermosensitive section can be varied by the thermal energy generated from the heating section, enabling the rewriting of the display information to be conducted solely within the body of the card.

The construction may be such that the card with a display function described above comprises a memory for storing data, and a control device for controlling the writing of data to, and reading of data from, the memory, and the heating section generates thermal energy in accordance with a display command output from the control device.

With such a construction, then in the case of a card such as an IC card, which is provided with a function for storing data internally, information corresponding to the stored data can be displayed automatically by the display device.

Furthermore, another possible construction may be such that the card with a display function comprises a communication device for carrying out communication with an external card processing apparatus, and the heating section generates thermal energy in accordance with a display command sent from the card processing apparatus via the communication device.

With such a construction, thermal energy is emitted from the heating section in accordance with a display command from the card processing apparatus.

Yet another possible construction may be such that the card with a display function combines the constructions described above, that is, comprises a memory for storing data, a control device for controlling the writing of data to, and reading of data from, the memory, and a communication device for carrying out communication with an external card processing apparatus, and the heating section generates thermal energy in accordance with either a display command sent from the card processing apparatus via the communication device, or a display command output from the control device.

With such a construction, the communication of commands and data and the like between the card and the card processing apparatus is conducted via the communication device, and the execution of processing for the writing of data to, and reading of data from, the memory, as well as the rewriting of the display information in accordance with the processing, is carried out within the card.

As a specific example of the type of communication device in a card with a display function described above, communication with the card processing apparatus may be conducted in a non-contact manner. Thereby, a display function can be realized with a simple construction for a so-called non-contact card.

As another specific example of a communication device, communication with the card processing apparatus may be conducted via a contact element. Thereby, a display function can be realized with a simple construction for a so-called contact card.

The communication device of the contact type cards described above may conduct data communication with a card processing apparatus in a non-contact manner. With such a construction, data communication with the card processing apparatus is conducted in a non-contact manner, without having to pass through a contact element, thereby enabling the reliability of the card.

The card with a display function described above may comprise an electrical power supply device for operating each section of the card using electrical power supplied from the card processing apparatus. Furthermore, the electrical power supply device may also be constructed so as to obtain electrical power from an electromagnetic induction wave transmitted from the card processing apparatus. Moreover, a heating electrical power supply device for obtaining electrical power for supply to the heating section from the card processing apparatus may also be provided. As a result, an unpowered card with a display function, which does not require batteries or the like in the body of the card, can be realized.

Furthermore, with the card with a display function described above, the heating section may comprise a plurality of heating elements, and a selection section may be provided for selecting a heating element or heating elements from amongst the plurality of heating elements for generating thermal energy in accordance with a display command. Moreover, a heating control section may also be provided for controlling the amount of thermal energy generated by the heating section in accordance with a display command.

With such a construction, by selectively heating specific heating elements of the heating section, or controlling the amount of heating, in accordance with a display command sent from the card processing apparatus or the control device, information of various types can be displayed by the variation in state of the thermosensitive section.

Furthermore, the thermosensitive section may also incorporate a reversible thermosensitive material, the state of which would vary reversibly on sensing thermal energy. The reversible thermosensitive material may be either a color development type or a light scattering type. Such a thermosensitive section would enable the repeated renewal of the display information in accordance with rewriting of stored data.

BEST MODE FOR CARRYING OUT THE INVENTION

As follows is a description of cards with a display function according to the present invention, based on the drawings.

Figure 1:
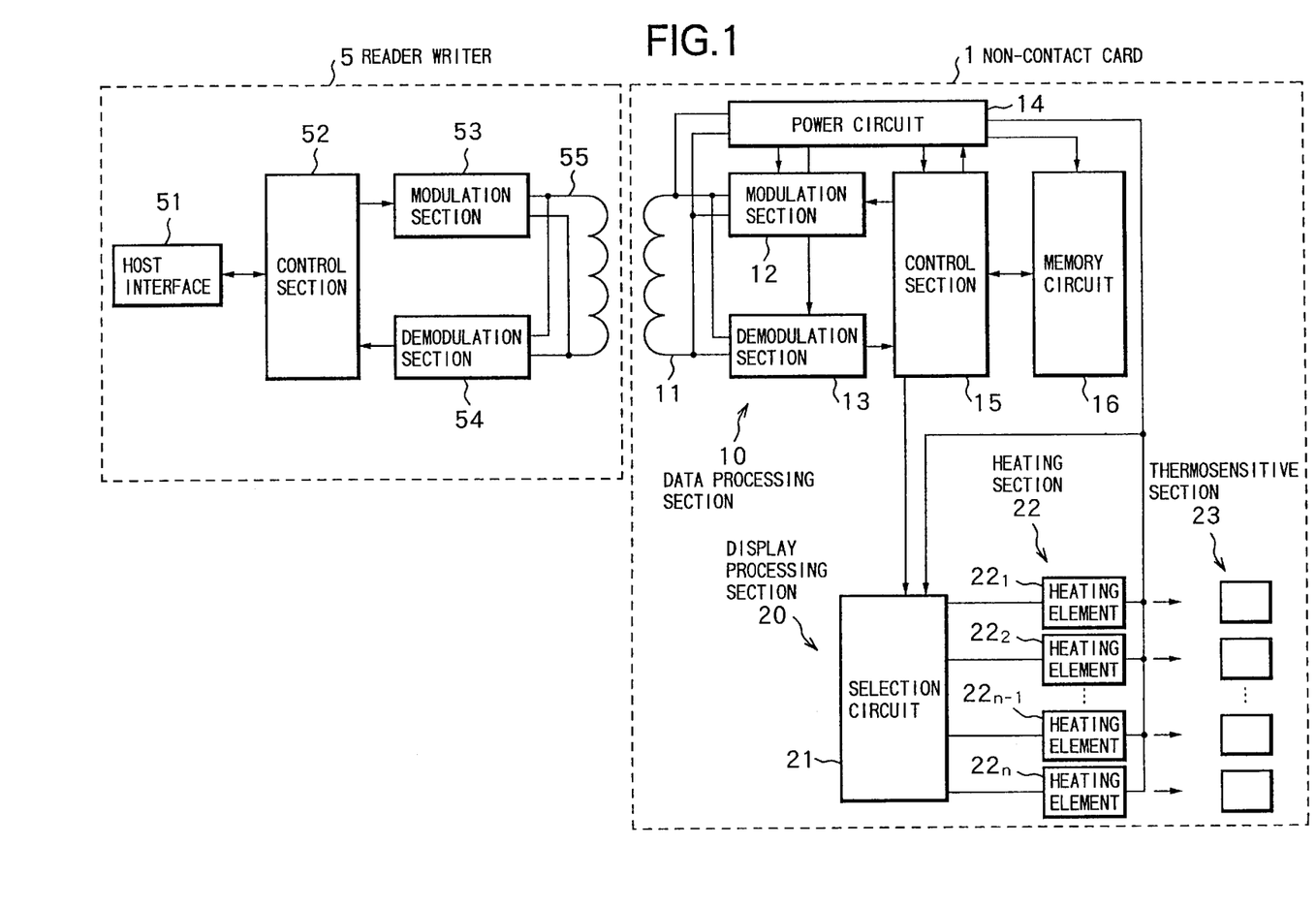
FIG. 1 is a block diagram showing the construction of a non-contact card with a display function and a card processing apparatus according to a first embodiment of the present invention.

FIG. 1 is a block diagram showing the construction of a non-contact card with a display function and a card processing apparatus for use with such a card, according to a first embodiment of the present invention.

In FIG. 1, the basic construction of a non-contact card 1 comprises a data processing section 10 and a display processing section 20 which functions as a display device. The data processing section 10 further comprises: an antenna 11, a modulation section 12, a demodulation section 13, a power circuit 14 which functions as an electrical power supply device, a control section 15 which functions as a control device, and a memory circuit 16 which functions as a memory. Furthermore, the display processing section 20 further comprises a selection circuit 21 which functions as a selection section, a heating section 22, and a thermosensitive section 23.

The antenna 11 of the data processing section 10 is a transceiver coil for receiving signals transmitted from an external reader writer 5 which is a card processing apparatus, and transmitting signals to be sent from the non-contact card 1 to the reader writer 5. The modulation section 12 generates a modulated signal in accordance with stored data read from the memory circuit 16, and outputs the signal to the antenna 11. The modulated signal is transmitted to the outside via the antenna 11. The demodulation section 13 demodulates signals received via the antenna 11 and sends commands and data from the reader writer 5 to the control section 15. The power circuit 14 obtains electrical power from the electromagnetic induction wave transmitted from the reader writer 5 and received by the antenna 11, and then supplies the electrical power to each section of the non-contact card 1. The control section 15 controls the operation of each section in the data processing section 10, such as the writing of data to, and the reading of data from, the memory circuit 16, as well as outputting display commands for controlling the operation of the display processing section 20. The memory circuit 16, under the control of the control section 15, is able to store, update, and delete data. A portion of the stored data within the memory circuit 16, or alternatively all of the data, or alternatively information relating to the stored data, is displayed to the outside by the display processing section 20.

The selection circuit 21 of the display processing section 20 generates a signal, in accordance with a display command from the control section 15, for selecting whether or not each of a plurality of heating elements $22_1 \sim 22_n$ of the heating section 22 will be heated, and then outputs the signal to each of the heating elements $22_1 \sim 22_n$. The heating section 22 is comprised of a plurality (n in this example) of heating elements $22_1 \sim 22_{n1}$ and when selected by the selection circuit 21 each heating element $22_1 \sim 22_n$ receives an electrical power supply from the power circuit 14 and generates thermal energy. The thermosensitive section 23 incorporates a thermosensitive material, the material state of which varies on sensing the thermal energy emitted from the heating section 22, so that the state of those portions which correspond to the selected heating elements $22_1 \sim 22_n$ will differ from the state of the other portions, thereby enabling information corresponding to the stored data of the memory circuit 16 to be displayed visually.

Figure 2:
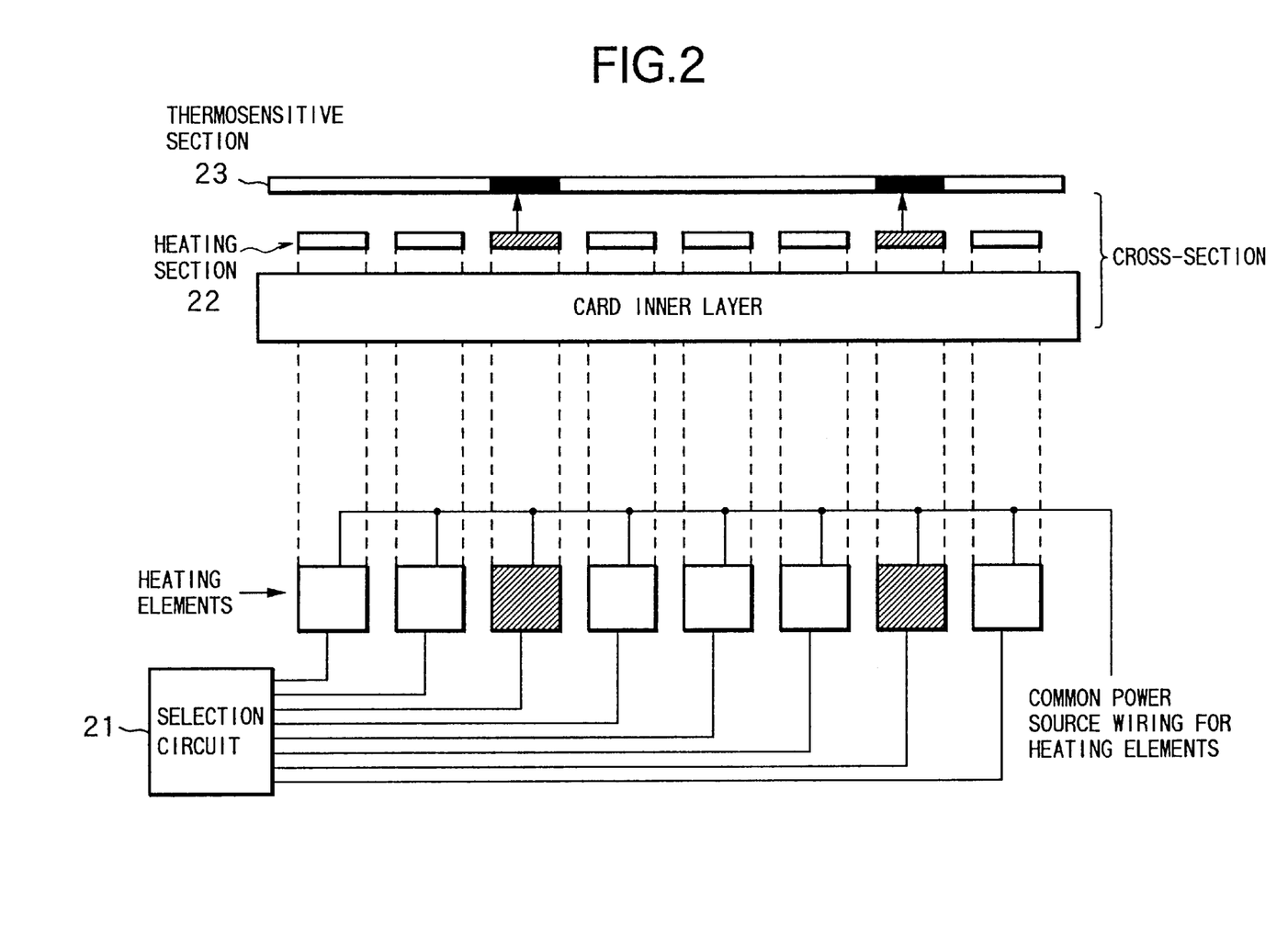
FIG. 2 is a diagram explaining the configuration of a heating section and a thermosensitive section of the first embodiment.

FIG. 2 is a diagram describing the configuration of the heating section 22 and the thermosensitive section 23, with the upper portion of the diagram showing a cross-section of the card, and the lower portion showing the corresponding circuit diagram.

As shown in FIG. 2, each heating element of the heating section 22 is arranged in a predetermined position on the inner layer of the card and the thermosensitive section 23 is arranged on the upper surface of the heating section 22, and as a result of the thermal energy generated by those heating elements selected by the selection circuit 21 (in the figure, those heating elements with diagonal shading), the state of the portions of the thermosensitive section 23 positioned above the selected heating elements will vary, enabling the display of a variety of information.

Figure 3:
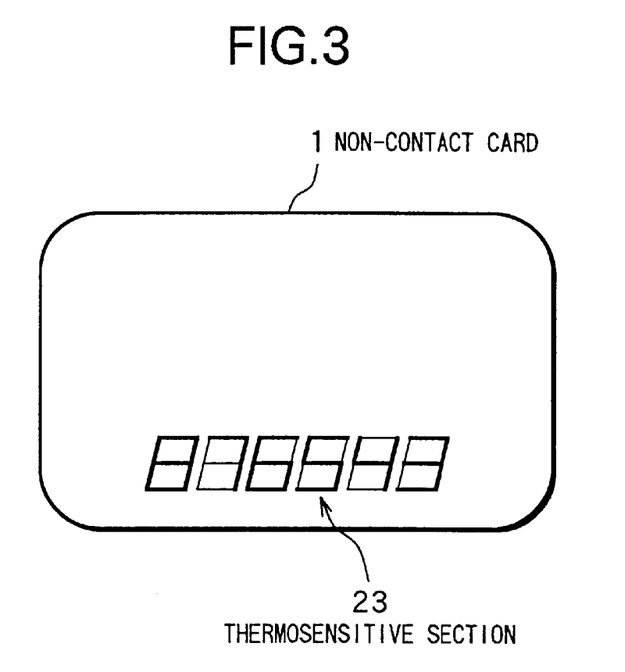
FIG. 3 is an external view of a card showing a specific example for displaying numerical data in the first embodiment.
Figure 4:
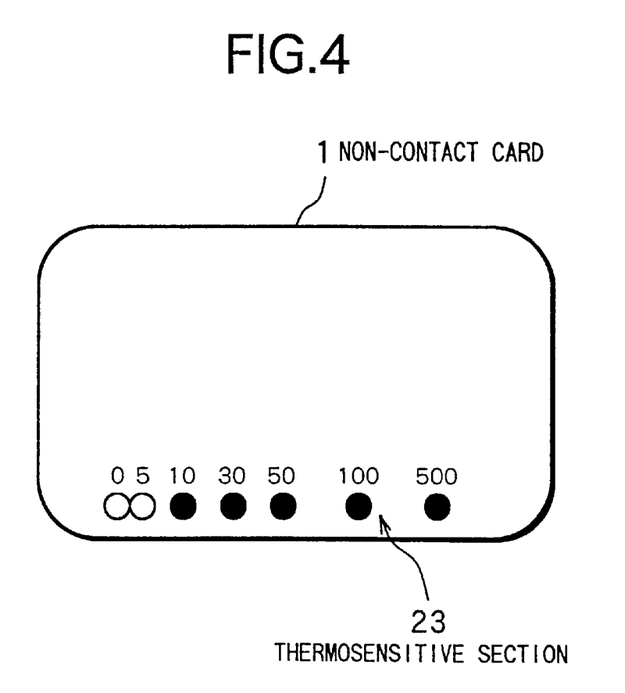
FIG. 4 is an external view of a card of the first embodiment showing a specific example for displaying a remaining balance indication.

FIG. 3 and FIG. 4 are external views of cards which show specific examples of the type of information displayed by the display processing section 20. However, the possible information display configurations for the present invention are not limited to those shown in the diagrams.

The example shown in FIG. 3 shows a case where each of the heating elements of the heating section 22 and the thermosensitive section 23 have been arranged so as to enable the display of numerical data on the card surface. The display of numerical data in this manner is particularly suitable for uses such as the display of expiry dates on commuter passes used on the various transportation networks, or the display of accumulated valid points in a point card system.

With a non-contact card 1 for the display of numerical data, in order to make the numerical data continuously variable, it is necessary to form the thermosensitive section 23 from a reversible thermosensitive material the state of which will vary in a reversible manner on sensing thermal energy. Examples of this type of reversible thermosensitive material include the rewritable recording materials disclosed in the article "Rewritable Recording Materials which can be Repeatedly Recorded and Erased" in the "The Coloring Materials Association Journal (Coloring materials and interface control) (Vol. 69, No. 5, May 1996)" published by the Coloring Materials Association Inc. on May 5, 1996.

The rewritable recording materials disclosed in the above article have at least two energetically stable states, and are able to vary the states in bi-directions through application of an external stimulus (thermal energy). The rewritable materials can be broadly divided into color development type materials, and light scattering type materials, based on differences in the display system. Representative examples of the color development type material are rewritable recording materials of the leuco pigment system, which are known to remain colored under heating or rapid cooling, but lose color under slow cooling. Furthermore in addition to leuco pigment systems, color development type rewritable recording materials based on photochromic material system or cholesteric liquid crystal system are also known. In the case of light scattering type rewritable recording materials, examples including materials based on organic low molecular/high molecular systems, and the use of thermal hysteresis to operate between a cloudy state and a transparent state thereby achieving a visual display are known. Moreover, in the case of light scattering type materials, it is also possible to form a light reflective layer such as a thin film of aluminum in order to improve the contrast.

The example shown in FIG. 4 shows a case where each of the heating elements of the heating section 22 and the thermosensitive section 23 have been arranged so as to enable the display of a remaining balance indication on the various types of prepaid cards, such as telephone cards. In this case, the thermosensitive section 23 can utilize a thermosensitive material the state of which, like normal thermal paper, can not vary once the color has been developed. However, in the case of a recyclable type prepaid card which can be used repeatedly by adding to the remaining balance on the card, the same reversible thermosensitive materials as those described above in relation to FIG. 3 can be used.

Furthermore, the reader writer 5 (FIG. 1) for carrying out writing of data to, and reading of data from the non-contact card 1 comprises, for example, a host interface 51, a control section 52, a modulation section 53, a demodulation section 54, and an antenna 55. The host interface 51 is the connection interface with the host apparatus (not shown in the figures) which is connected with the reader writer 5. The control section 52 outputs signals received via the host interface 51 to the modulation section 53, as well as receiving demodulated signals from the demodulation section 54 and sending the signals through the host interface 51 to the host apparatus. The modulation section 53 generates modulated signals in accordance with the signals from the control section 52, and these signals are transmitted from the antenna 55 toward the non-contact card 1. The signals transmitted through the antenna 55 are signals representing commands or data for writing to the non-contact card 1, as well as being an electromagnetic induction wave for supplying electrical power to the non-contact card 1. The demodulation section 54 demodulates signals from the non-contact card 1 received via the antenna 55, reproduces the stored data on the non-contact card 1, and sends the data to the control section 52. The antenna 55 is a transceiver coil for conducting signal communication with the non-contact card 1.

As follows is a description of the operation of the first embodiment.

First, when the non-contact card 1 receives, via the antenna 11, a signal transmitted from the antenna 55 of the reader writer 5, the received signal is sent to the demodulation section 13 and the power circuit 14. At the power circuit 14, the electromagnetic induction wave received via the antenna 11 undergoes rectification or the like, and is converted to electrical power for supply to each of the sections of the non-contact card 1. Furthermore at the demodulation section 13, demodulation processing of the received signal is carried out, and commands from the reader writer 5 or data for storage in the memory circuit 16 is regenerated and sent to the control section 15. Then, in accordance with the signal from the demodulation section 13, the control section 15 executes processing such as the writing of data to, the updating of data in, or the removal of data from, the memory circuit 16, and then on completion of such processing, outputs commands to the selection circuit 21 of the display processing section 20 for displaying information corresponding to the stored data within the memory circuit 16 (either a portion of, or all of the data, or information relating to the stored data). Furthermore, the control section 15 also executes processing for the reading of the stored data in the memory circuit 16, and outputs the stored data that has been read to the modulation section 12. At the modulation section 12 a signal modulated in accordance with the stored data received from the control section 15 is output to the antenna 11, and then transmitted from the antenna 11 to the reader writer 5.

On reception of a display command from the control section 15, the selection circuit 21 generates a signal for selecting those heating elements $22_1 \sim 22_n$ of the heating section 22 which will be used to generate thermal energy, and outputs the signal to the heating section 22. Each of the heating elements $22_1 \sim 22_n$ is supplied with electrical power from the power circuit 14, and current will flow only through the heating elements selected based on the signal from the selection circuit 21 and be converted to thermal energy. Then, the thermal energy emitted from the selected heating elements will cause the corresponding portions of the thermosensitive section 23 to develop color, for example, thereby displaying in a visual manner the information corresponding to the stored data.

Specifically, in a commuter pass or the like on which the display of numerical data is carried out as shown in FIG. 3, in order to display on the thermosensitive section 23 a number which matches the expiry date or the like written in the memory circuit 16, those heating elements which correspond to the portions representing the desired number are selected by the selection circuit 21. Moreover, if the expiry date of the commuter pass: is then updated to a new limit, then those heating elements which will display a number corresponding to the new expiry date are selected, and the state of the thermosensitive section 23 varies to automatically update the display of the expiry date.

Furthermore, in a prepaid card or the like on which the display of a remaining balance indication is carried out as shown in FIG. 4, when the remaining balance data stored in the memory circuit 16 reaches an indicated amount through usage of the card and a corresponding reduction in the remaining balance, then in order to cause the portion of the thermosensitive section 23 that corresponds to that particular remaining balance indication to undergo color development or the like, the heating element corresponding to that particular portion is selected by the selection circuit 21. Then, as the card is used, those portions of the thermosensitive section 23 corresponding to the various remaining balance indications undergo sequential color development, until the point where there is no remaining balance on the card and the entire thermosensitive section 23 has undergone color development, thereby displaying that the card has been entirely spent.

In this manner, with the first embodiment, by providing a thermosensitive section 23 and a heating section 22 for varying the state of the thermosensitive section 23 within the body of the non-contact card 1, and then selectively controlling the heating state of the heating section 22 in accordance with the stored data in the memory circuit 16, then the processing for the rewriting of the display information can be conducted automatically within the non-contact card 1, without requiring the use of an external rewriting apparatus. This means that without losing the feature of non-contact cards wherein data processing can be carried out without a card transport system, an effect is achieved in terms of enabling the display of information corresponding to the stored data. Consequently, users of prepaid cards or the like can, for example, accurately ascertain the remaining balance on the card based on the display information, and can avoid such situations wherein an entirely spent card is sold on by another person. Furthermore in comparison with conventional display devices using liquid crystals, the construction of the display processing section 20 can be realized at low cost, and moreover with a comparatively thin construction, thereby enabling the production of a low cost, thin non-contact card 1.

Next is a description of a second embodiment of the present invention.

In the first embodiment described above, a construction is shown wherein the electrical power provided by the power circuit 14 of the data processing section 10 is also supplied to the display processing section 20. With such a construction, in those cases where, for example, the amount of display information is comparatively limited and the amount of thermal energy generated by the heating section 22 is comparatively small, then the construction of the card is comparatively simple and efficient. However, if the amount of display information increases and the amount of thermal energy generated by the heating section 22 increases, then cases can arise wherein the electrical power provided only by the power circuit 14 of the data processing section 10 is insufficient. Therefore a description is given for the case where, in the second embodiment, the display processing section 20 is also provided with a device for obtaining electrical power by receiving an electromagnetic induction wave from the reader writer 5, so that the heating section 22 is supplied with sufficient electrical power.

Figure 5:
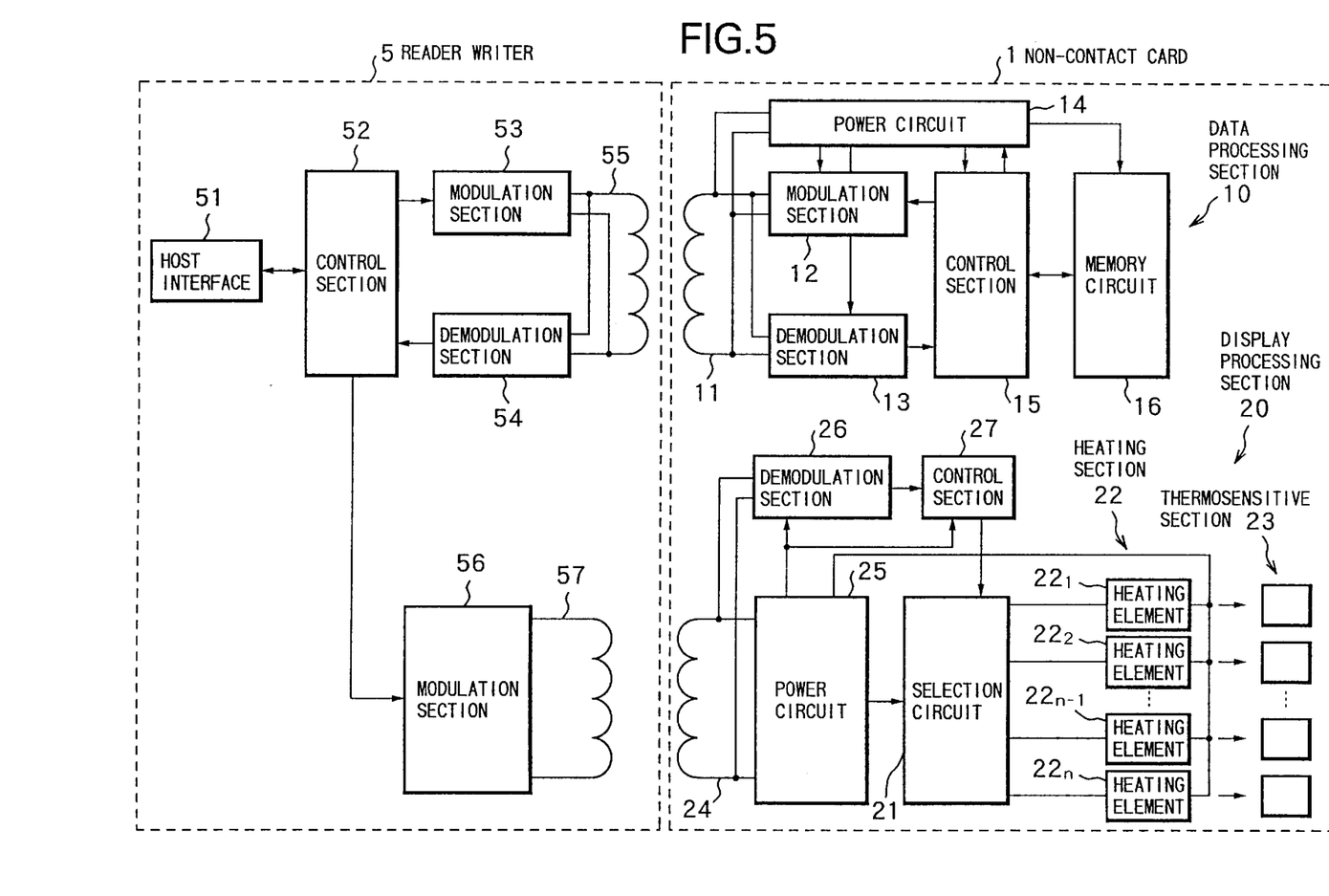
FIG. 5 is a block diagram showing the construction of a non-contact card with a display function and a card processing apparatus according to a second embodiment of the present invention.

FIG. 5 is a block diagram showing the construction of a non-contact card with a display function, and a reader writer for use with such a card, according to the second embodiment of the present invention.

In FIG. 5, the construction of the non-contact card 1 differs from the construction of the first embodiment in that an antenna 24, a power circuit 25 which functions as an electrical power supply device for heating purposes, a demodulation section 26, and a control section 27 are added to the display processing section 20, and each of the heating elements $22_1 \sim 22_n$ of the heating section 22 receive electrical power supply from the power circuit 25, and the selection circuit 21 carries out selection of the heating elements in accordance with a signal from the control section 27. Furthermore, the construction of the reader writer 5 used in the second embodiment differs from the construction of that used in the first embodiment in that a modulation section 56 and an antenna 57 for sending signals to the display processing section 20 of the noncontact card 1 are also provided. With the above exceptions, the constructions of the non-contact card 1 and the reader writer 5 are identical with those of the first embodiment.

The modulation section 56 of the reader writer 5 generates a modulated signal for use by the display processing section 20 in accordance with a signal sent from the control section 52 and outputs the modulated signal to the antenna 57. This signal for use by the display processing section 20 corresponds to the signal generated by the modulation section 53 for use by the data processing section 10, and represents commands instructing the writing of data to the non-contact card 1 or the data to be written on to the noncontact card 1, as well as being an electromagnetic induction wave for supplying electrical power to the display processing section 20. The antenna 57 is a transmission coil similar to the antenna 55.

The antenna 24 of the display processing section 20 within the noncontact card 1 is a reception coil for receiving signals transmitted from the antenna 57 of the reader writer 5. The power circuit 25 obtains electrical power from the electromagnetic induction wave received by the antenna 24, and supplies the electrical power to each of the sections in the display processing section 20. The demodulation section 26 demodulates the signal received via the antenna 24 and sends the commands or data from the reader writer 5 to the control section 27. The control section 27 outputs a display command signal to the selection circuit 21, in accordance with the signal received from the demodulation section 26, for displaying information which corresponds to the stored data in the memory circuit 16.

With a non-contact card 1 of the construction described above, signals for use by the data processing section 10, and signals for use by the display processing section 20, which have been transmitted from the reader writer 5, are received by the antenna 11 and the antenna 24 respectively. Then, the same processing as that described for the first embodiment is executed at the data processing section 10, thereby carrying out the rewriting of the stored data in the memory circuit 16. Furthermore, at the same time as the above processing is being carried out within the data processing section 10, at the display processing section 20, the generation and supply of electrical power is carried out by the power circuit 25, and commands are output from the control section 27 to the selection circuit 21, in accordance with the demodulated signal from the demodulation section 26, for displaying information which corresponds to the stored data in the memory circuit 16. On receiving the display commands from the control section 27, the selection circuit 21, in the same manner as that described for the first embodiment, outputs a signal for selecting those heating elements $22_1$~$22_n$ of the heating section 22 which will be used to generate thermal energy. Current then flows only through the selected heating elements, with the thermal energy emitted from the selected heating elements causing the corresponding portions of the thermosensitive section 23 to develop color, for example, thereby displaying in a visual manner the information corresponding to the stored data.

As described above, with the second embodiment, a signal for use by the display processing section 20 is sent from the reader writer 5 to the non-contact card 1. Then at the display processing section 20 of the non-contact card 1, an electrical power is obtained based on the received signal and the processing such as rewriting to be executed by the data processing section 10 is recognized. The display of information is then carried out in accordance with the stored data. By so doing, in addition to the effects obtained in the first embodiment, it is possible with the second embodiment to ensure a sufficient supply of electrical power to the heating section 22, even in those cases where the amount of display information is increased.

Moreover, in the second embodiment above, the situation was described where the processing such as rewriting of stored data carried out by the data processing section 10, and the processing for displaying information carried out by the display processing section 20, occurs in parallel. However in such a case, since the respective processing by the data processing section 10 and the display processing section 20 is executed independently, there is a possibility that the displayed information will no longer correspond to the stored data in the memory circuit 16. In order to prevent this type of discrepancy between the displayed information and the stored data, then for example, the processing such as rewriting of the stored data may first be executed by the data processing section 10, and a signal showing the results of this processing subsequently returned from the data processing section 10 to the reader writer 5, with a signal for switching the display in accordance with this received signal then being sent from the reader writer 5 to the display processing section 20 of the non-contact card 1.

Next is a description of a third embodiment of the present invention.

The third embodiment shows an example of an improved system based on a simplification of the construction of the second embodiment.

Figure 6:
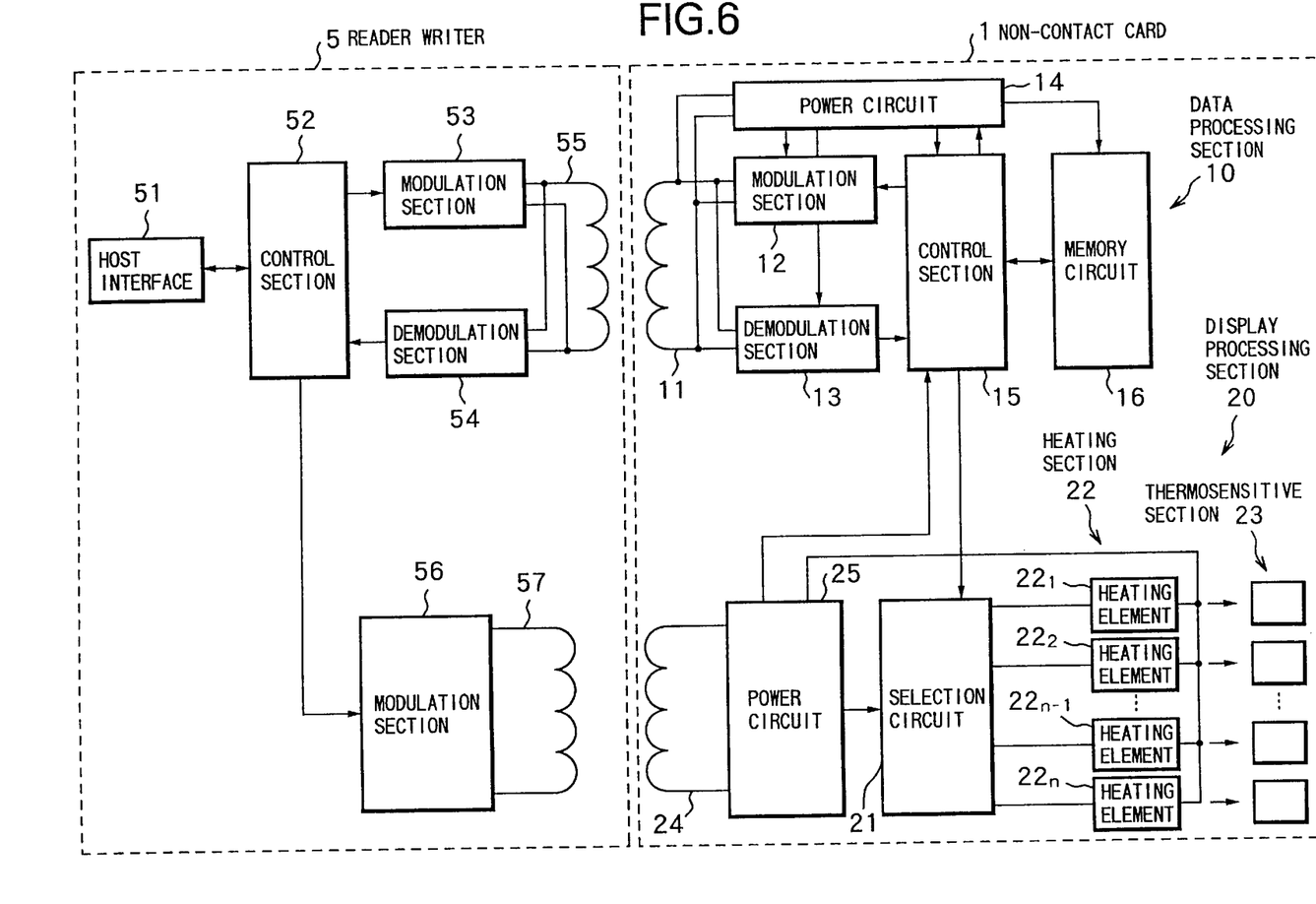
FIG. 6 is a block diagram showing the construction of a non-contact card with a display function and a card processing apparatus according to a third embodiment of the present invention.

FIG. 6 is a block diagram showing the construction of a non-contact card with a display function and a reader writer for use with such a card, according to the third embodiment of the present invention.

In FIG. 6, the non-contact card 1 of the third embodiment is based on the construction of the second embodiment, but with the demodulation section 26 and the control section 27 of the display processing section 20 omitted. With this embodiment a signal which indicates that a required electrical power has been obtained is sent from the power circuit 25 of the display processing section 20 to the control section 15 of the data processing section 10, and display commands are sent from the control section 15 of the data processing section 10 to the selection circuit 21 of the display processing section 20. Furthermore, the reader writer 5 used in the third embodiment differs from that used in the second embodiment in that the signal for use by the display processing section 20 transmitted from the antenna 57 is used as the electromagnetic induction wave for supplying electrical power to the display processing section 20, and does not incorporate a signal component for the command of data rewriting or the like. With the exceptions of the differences described above, the construction of the non-contact card 1 and the reader writer 5 are the same as for the second embodiment.

With a non-contact card 1 of such a construction, when a signal for use by the data processing section 10 and a signal for use by the display processing section 20 which are transmitted from the reader writer 5, are received by the antenna 11 and the antenna 24 respectively, then at the data processing section 10 the same processing as that described for the first embodiment is carried out for the rewriting and the like of the stored data, while at the display processing section 20 generation of electrical power from the electromagnetic induction wave is conducted at the power circuit 25. Then, when a required electrical power is obtained by the power circuit. 25, a signal to convey that information is sent from the power circuit 25 to the control section 15 of the data processing section 10. When it is ascertained that the rewriting of the stored data in the memory circuit 16 has been completed, and moreover the required electrical power has been achieved at the power circuit 25 of the display processing section 20, then the control section 15 outputs a command to the selection circuit 21 of the display processing section 20 for displaying information corresponding to the stored data. The selection circuit 21 outputs a signal for selecting the heating elements of the heating section 22 in accordance with the display command from the control section 15. Then, in the same manner as that described for the second embodiment, current flows through only the selected heating elements with the thermal energy emitted from the selected heating elements, causing the corresponding portions of the thermosensitive section 23 to develop color, for example, thereby displaying information corresponding to the stored data.

With the third embodiment, by providing a construction for demodulating and regenerating signals sent from the reader writer 5 only within the data processing section 10, the construction of the non-contact card 1 can be simplified. Hence it is possible to produce thin non-contact cards 1 of even lower cost.

Next is a description of a fourth embodiment of the present invention. The fourth embodiment considers a contact type card in which communication with a reader writer is conducted via a contact element.

Figure 7:
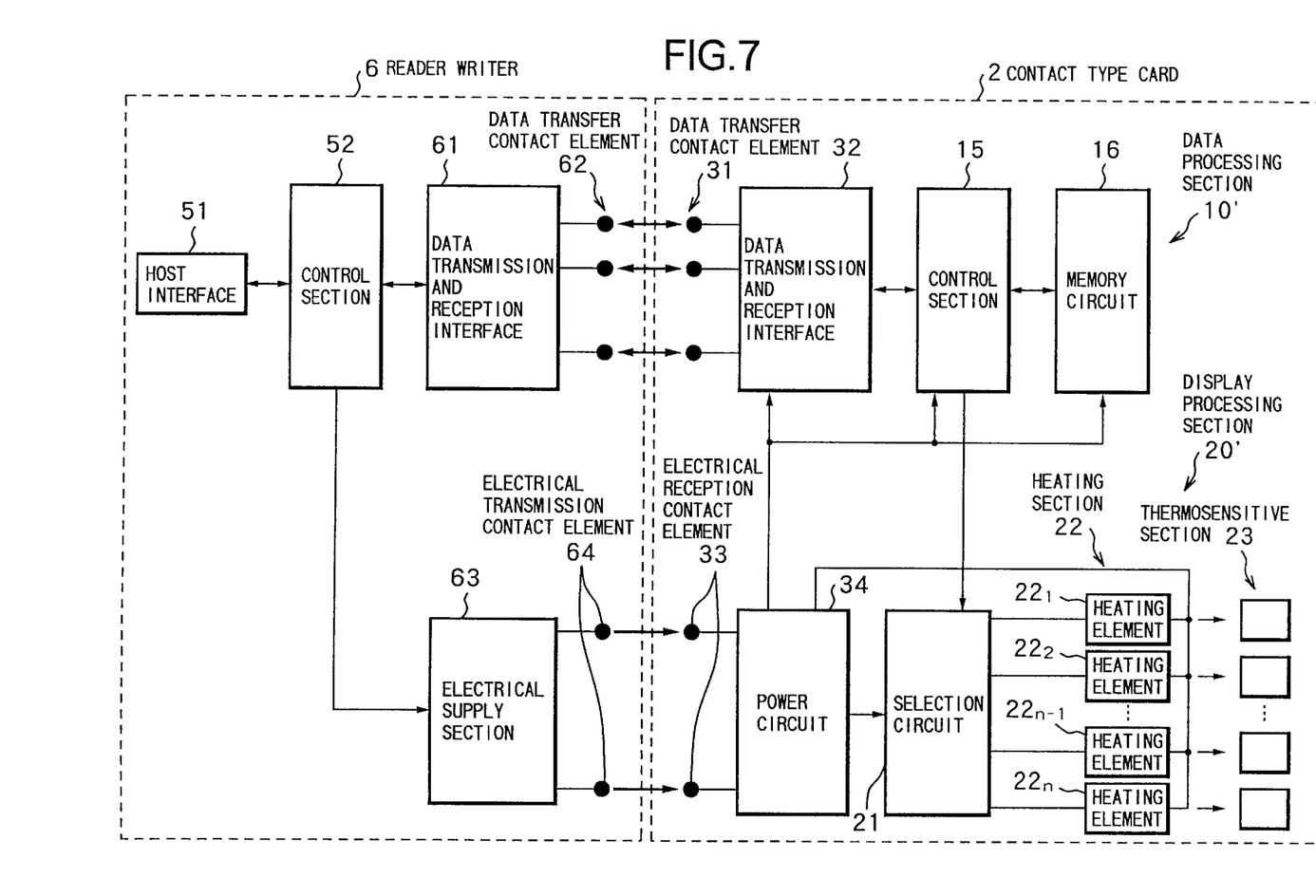
FIG. 7 is a block diagram showing the construction of a contact type card with a display function and a card processing apparatus according to a fourth embodiment of the present invention.

FIG. 7 is a block diagram showing the construction of a contact type card with a display function and a reader writer for use with such a card according to the fourth embodiment of the present invention. Those sections which are identical with those described in the first through third embodiments are denoted with the same numerals.

In FIG. 7, the basic construction of a contact type card 2 comprises a data processing section 10' and a display processing section 20'. The data processing section 10' comprises a data transfer contact element 31, a data transmission and reception interface 32, and a control section 15 and a memory circuit 16 identical with those described for the first embodiment. The display processing section 20' comprises an electrical reception contact element 33, a power circuit 34, and a selection circuit 21, a heating section 22 and a thermosensitive section 23 identical with those described for the first embodiment.

The data transfer contact element 31 is a terminal for making contact with a data transfer contact element 62 provided within a reader writer 6 which functions as an external card processing device, to connect the contact type card 2 and the reader writer 6, thereby forming a transmission path for the transmission and reception of data. The data transmission and reception interface 32 is a connection interface for matching signals sent and received between the contact type card 2 and the reader writer 6.

The electrical reception contact element 33 is a terminal for making contact with an electrical transmission contact element 64 provided within the reader writer 6, to receive electrical power sent from the reader writer 6. The power circuit 34 supplies the electrical power received from the reader writer 6 via the electrical reception contact element 33 to each of the sections of the contact type card 2.

Figure 8:
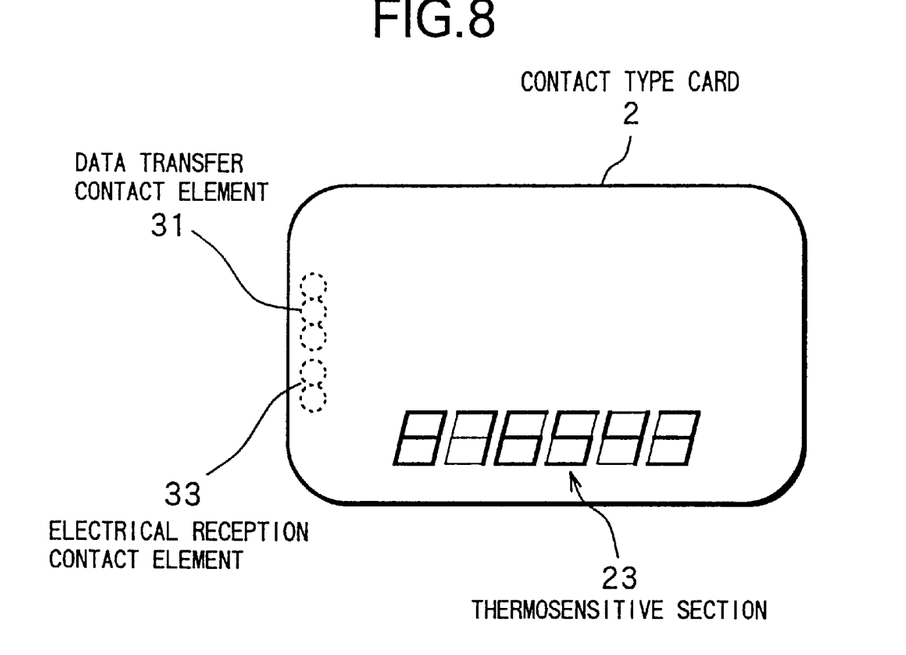
FIG. 8 is an external view of a card showing a specific example for displaying numerical data in the fourth embodiment.
Figure 9:
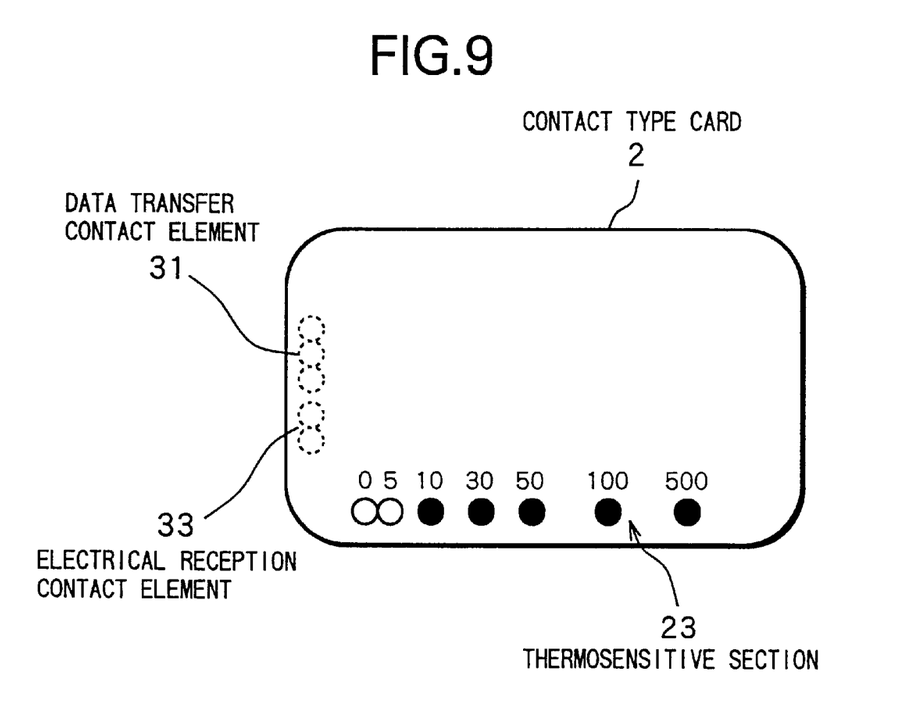
FIG. 9 is an external view of a card showing a specific example for displaying a remaining balance indication in the fourth embodiment.

FIG. 8 and FIG. 9 are similar to the non-contact cards 1 shown in FIG. 3 and FIG. 4, and show the external views of specific examples of the contact type card 2.

As shown in FIG. 8 and FIG. 9, the contact type cards differs from the non-contact cards 1 in that the data transfer contact element 31 and the electrical reception contact element 33 are arranged in predetermined positions, respectively.

The reader writer 6 (of FIG. 7) comprises for example, a data transmission and reception interface 61, the data transfer contact element 62, an electrical supply section 63, the electrical transmission contact element 64, and a host interface 51 and a control section 52 identical with those described in the first embodiment.

The control section 52 controls the transmission of signals between the host interface 51 and the data transmission and reception interface 61, as well as controlling the operation of the electrical supply section 63. The data transmission and reception interface 61 is a connection interface for matching data sent and received between the reader writer 6 and the contact type card 2. The data transfer contact element 62 is a terminal for making contact with the data transfer contact element 31 of the contact type card 2, to connect the contact type card 2 and the reader writer 6, thereby forming a transmission path for the transmission and reception of data. The electrical supply section 63, under the control of the control section 52, generates electrical power for supply to the contact type card 2 and sends the electrical power to the electrical transmission contact element 64. The electrical transmission contact element 64 makes contact with the electrical reception contact element 33 of the contact type card 2, to supply electrical power from the electrical supply section 63 to the contact type card 2.

As follows is a description of the operation of the fourth embodiment.

First, when the contact type card 2 receives a data signal and an electrical supply sent from the reader writer 6 via the data transfer contact element 31 and the electrical reception contact element 33 respectively, then the data signal is sent to the control section 15 via the data transmission and reception interface 32, and the electrical supply is sent to the power circuit 34. At the power circuit 34, the electrical power from the reader writer 6 is received and then supplied to each of the sections of the contact type card 2. The control section 15 executes processing for the writing of data to, the rewriting of data within, or the removal of data from, the memory circuit 16 in accordance with the data signal received from the reader writer 6, and following completion of such processing outputs commands to the selection circuit 21 of the display processing section 20' for displaying information (either a portion of, or all of, the stored data, or information relating to the stored data) corresponding to the stored data in the memory circuit 16. Furthermore, the control section 15 also executes processing for the reading of the stored data within the memory circuit 16, and then transmits the stored data which has been read, to the reader writer 6 via the data transmission and reception interface 32 and the data transfer contact element 31.

On reception of a display command from the control section 15, the selection circuit 21 generates a signal for selecting those heating elements $22_1$~$22_n$ of the heating section 22 which will be used to generate thermal energy, and outputs the signal to the heating section 22. Each of the heating elements $22_1$~$22_n$ is supplied with electrical power from the power circuit 34, and based on the signal from the selection circuit 21, current will flow only through the selected heating elements and be converted to thermal energy. Then, the thermal energy emitted from the selected heating elements will cause the corresponding portions of the thermosensitive section 23 to develop color, for example, thereby displaying in a visual manner the information corresponding to the stored data.

In this manner, with the fourth embodiment, the processing for the rewriting of the display information on contact type cards can be conducted automatically within the card, without requiring the use of an external rewriting apparatus, in the same manner as that described for non-contact cards.

As follows is a description of a fifth embodiment of the present invention.

The fifth embodiment considers a contact type card wherein, in order to improve the reliability of the contact type card of the fourth embodiment described above, data transmission between the card and the reader writer is carried out in a non-contact manner.

Figure 10:
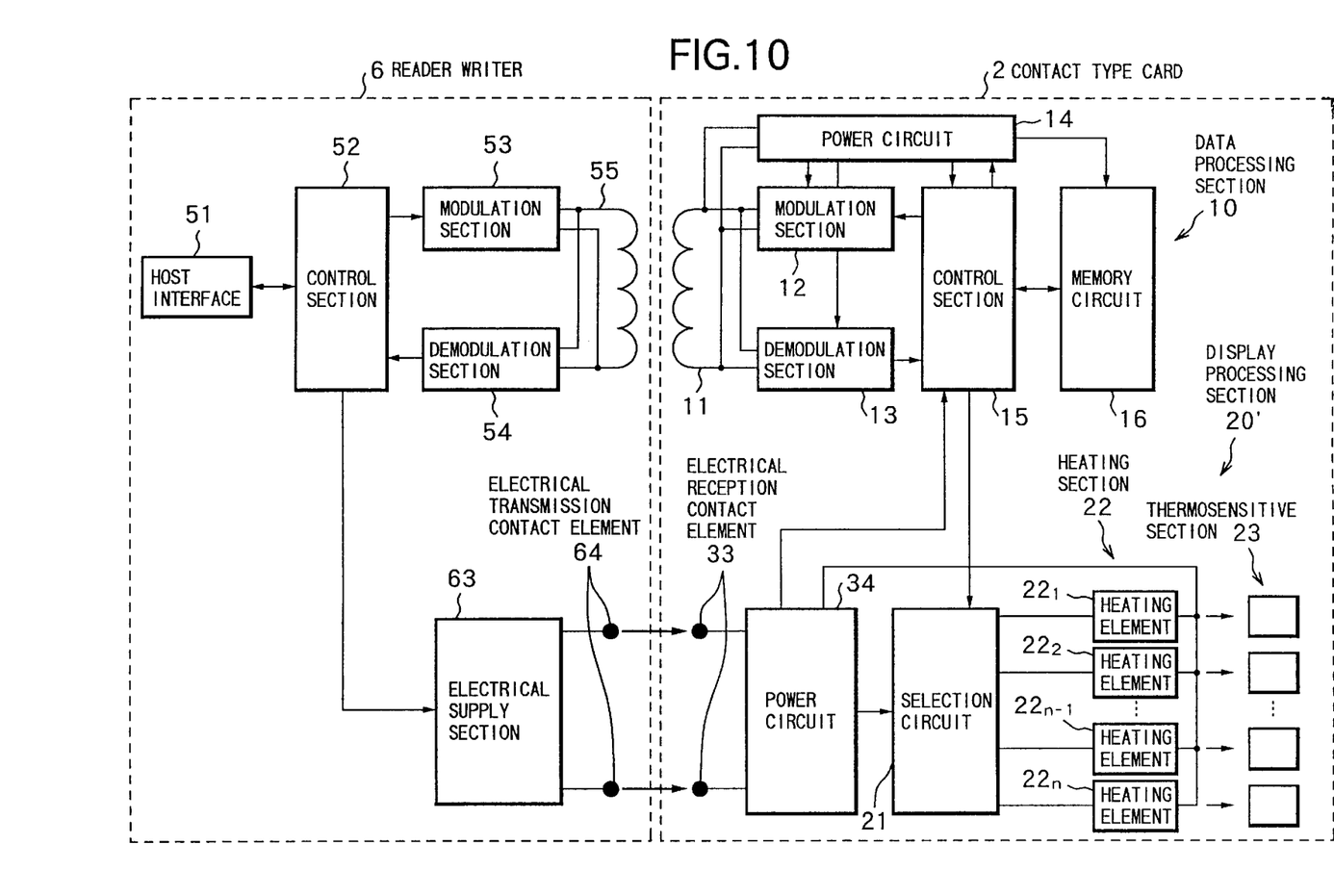
FIG. 10 is a block diagram showing the construction of a contact type card with a display function and a card processing apparatus according to a fifth embodiment of the present invention.

FIG. 10 is a block diagram showing the construction of a contact type card with a display function and a reader writer for use with such a card according to the fifth embodiment of the present invention.

In FIG. 10, the construction of the contact type card 2 of this fifth embodiment differs from that of the fourth embodiment in that instead of using a data processing section 10' comprising a data transfer contact element 31 or the like, a non-contact type data processing section 10 such as that used in the first embodiment is used. Furthermore, the construction of a reader writer 6 used in the fifth embodiment differs from that of the fourth embodiment in that instead of a data transmission and reception interface 61 and a data transfer contact element 62, a modulation section 53, a demodulation section 54, and an antenna 55 such as those used in the first embodiment are used. With the above exceptions, the constructions of the contact type card 2 and the reader writer 6 are identical with those of the fourth embodiment.

With such a construction, when the contact type card 2 receives at the antenna 11 a signal which has been transmitted from the antenna 55 of the reader writer 6, the received signal is sent to the demodulation section 13 and the power circuit 14. At the power circuit 14, the electromagnetic induction wave received via the antenna 11 undergoes rectification or the like, and is converted to electrical power for supply to each of the sections of the data processing section 10. Furthermore at the demodulation section 13, demodulation processing of the received signal is carried out, and commands from the reader writer 6 or data for storage in the memory circuit 16 are regenerated and sent to the control section 15. Then, in accordance with the signal from the demodulation section 13, the control section 15 executes processing such as the writing of data to the memory circuit 16.

Furthermore, at the same time as the above processing is being conducted at the data processing section 10, at the display processing section 20', when the electrical power which is being sent from the reader writer 6 through the electrical reception contact element 33 to the: power circuit 34 reaches a required level, a signal to convey that information is sent from the power circuit 34 to the control section 15 of the data processing section 10, and the electrical power is supplied to the selection circuit 21 and the heating section 22. When it is ascertained that the rewriting of the stored data in the memory circuit 16 has been completed, and moreover has ascertained that the predetermined electrical power has been achieved at the power circuit 34 of the display processing section 20', then the control section 15 outputs to the selection circuit 21 of the display processing section 20' for displaying information corresponding to the stored data. The selection circuit 21 outputs a signal for selecting the heating elements of the heating section 22 in accordance with the display command from the control section 15. Then, current flows through only the selected heating elements with the thermal energy emitted from the selected heating elements, causing the corresponding portions of the thermosensitive section 23 to develop color, for example, thereby displaying information corresponding to the stored data.

With the fifth embodiment described above, in addition to the effects obtained in the fourth embodiment, because the data transmission between the contact type card 2 and the reader writer 6 is carried out in a non-contact manner, the security of the stored data on the card is improved, and so a card with a display function with greater reliability is able to be provided.

In the first through fifth embodiments outlined above, descriptions are given of cards which comprise memory within the body of the card, such as an IC card. However the present invention is not limited to such cards, and can also be applied to cards which have no memory within the card and which are provided with only a display device. In such cases, a heating section is heated in accordance with a display command sent from an external card processing apparatus via a communication device such as wiring, and the state of a thermosensitive section then varies with the thermal energy generated.

Furthermore, the above descriptions assume a construction wherein a card with a display function obtains electrical power from a reader writer, namely an unpowered type construction which does not require a battery or the like within the card. However a card with a display function in which a power source is housed within the card may also be used.

Moreover, the embodiments described above considered the case where the heating section 22 comprises a plurality of heating elements. However the heating section may also comprise a single heating element, and in such a case the selection circuit can be omitted. Furthermore, in the above descriptions each heating element was put in one of two states by the selection circuit, namely either being heated or not being heated. However, for example, in those cases where the thermosensitive section 23 has more than two stable states, then a device (a heating control device) can be provided for controlling the amount of thermal energy generated by each heating element corresponding to the stored data, and then varying the state of the thermosensitive section 23 in a stepwise manner. Such an example would enable diversification of display information.

INDUSTRIAL APPLICABILITY

The present invention is widely applicable to both contact type cards and non-contact type cards used in various card systems, and offers many possible industrial applications.

What is claimed is:

1. A card with a display function having a thermosensitive section which varies in state on sensing thermal energy, and comprising display means within a body of said card for displaying information in accordance with the state of said thermosensitive section, wherein said display means incorporates a heating section for generating thermal energy, and the state of said thermosensitive section varies on sensing the thermal energy from said heating section.

2. A card with a display function according to claim 1, further comprising a memory for storing data, and control means for controlling the writing of data to, and reading of data from, said memory,
 wherein said heating section generates thermal energy in accordance with a display command output from said control means.

3. A card with a display function according to claim 1, further comprising communication means for carrying out communication with an external card processing apparatus,
 wherein said heating section generates thermal energy in accordance with a display command sent from said card processing apparatus via said communication means.

4. A card with a display function according to claim 3, further comprising a memory for storing data, and control means for controlling the writing of data to, and reading of data from, said memory,
 wherein said heating section generates thermal energy in accordance with either a display command sent from said card processing apparatus via said communication means, or a display command output from said control means.

5. A card with a display function according to claim 3, wherein said communication means conducts communication with said card processing apparatus in a non-contact manner.

6. A card with a display function according to claim 3, wherein said communication means conducts communication with said card processing apparatus via a contact element.

7. A card with a display function according to claim 6, wherein said communication means conducts data communication with said card processing apparatus in a non-contact manner.

8. A card with a display function according to claim 3, further comprising electrical power supply means for operating each section of said card using electrical power supplied from said card processing apparatus.

9. A card with a display function according to claim 8, wherein said electrical power supply means obtains electrical power from an electromagnetic induction wave transmitted from s aid card processing apparatus.

10. A card with a display function according to claim 8, further comprising heating electrical power supply means for obtaining electrical power for supply to said heating section from said card processing apparatus.

11. A card with a display function according to claim 1, wherein said heating section comprises a plurality of heating elements, and wherein a selection section is also provided for selecting a heating element or heating elements from amongst said plurality of heating elements for generating thermal energy in accordance with display command.

12. A card with a display function according to claim 1, further comprising a heating control section for controlling an amount of thermal energy generated by said heating section in accordance with display command.

13. A card with a display function according to claim 1, wherein said thermosensitive section incorporates a reversible thermosensitive material, the state of which varies reversibly on sensing thermal energy.

14. A card with a display function according to claim 13, wherein said reversible thermosensitive material is either a color development type material or a light scattering type material.

\* \* \* \* \*